US009762411B2

(12) United States Patent
Wang

(10) Patent No.: US 9,762,411 B2
(45) Date of Patent: Sep. 12, 2017

(54) NETWORK SYSTEM, SERVER, SWITCH, AND OPERATING METHOD OF NETWORK SYSTEM

(71) Applicant: Edgecore Networks Corporation, Hsinchu (TW)

(72) Inventor: Ran-Yih Wang, Taipei (TW)

(73) Assignee: Edgecore Networks Corporation, Hsinchu (TW)

( * ) Notice: Subject to any disclaimer, the term of this patent is extended or adjusted under 35 U.S.C. 154(b) by 936 days.

(21) Appl. No.: 14/071,663

(22) Filed: Nov. 5, 2013

(65) Prior Publication Data
US 2014/0359099 A1 Dec. 4, 2014

(30) Foreign Application Priority Data

Jun. 4, 2013 (TW) .............................. 102119807 U

(51) Int. Cl.
*G06F 15/16* (2006.01)
*H04L 12/46* (2006.01)
(Continued)

(52) U.S. Cl.
CPC ........ *H04L 12/4633* (2013.01); *H04L 12/465* (2013.01); *H04L 49/70* (2013.01); *H04L 41/5096* (2013.01); *H04L 45/586* (2013.01)

(58) Field of Classification Search
CPC ............. H04L 12/4633–12/4675; H04L 49/70
See application file for complete search history.

(56) References Cited

U.S. PATENT DOCUMENTS 9,042,384 B2 * 5/2015 Sridharan ............. H04L 45/586
370/392
9,304,798 B2 * 4/2016 Mudigonda ......... H04L 67/1095
(Continued)

FOREIGN PATENT DOCUMENTS

WO 2012166139 A1 12/2012

OTHER PUBLICATIONS

Onoue, Koichi, Naoki Matsuoka, and Jun Tanaka. "Host-based multi-tenant technology for scalable data center networks." Proceedings of the eighth ACM/IEEE symposium on Architectures for networking and communications systems. ACM, 2012.*
(Continued)

*Primary Examiner* — David Lazaro
*Assistant Examiner* — Julian Chang
(74) *Attorney, Agent, or Firm* — CKC & Partners Co., Ltd.

(57) ABSTRACT

The network system that includes a first server and a first switch is provided. The first server includes a first virtual machine. The first virtual machine (VM) is configured to provide a first VM packet including a first VM identifier (ID) to the first server. The first server is configured to acquire a tenant identifier corresponding to the first VM according to the first VM identifier, to convert the tenant identifier to a first feature data, and to encapsulate the first VM packet to generate and output a first server packet containing the first feature data. The first switch is configured to receive the first server packet, to acquire a service instance identifier (I-SID) according to the first feature data, to acquire a backbone VLAN identifier according to the I-SID, and to encapsulate the first server packet to generate and output a switch packet.

30 Claims, 2 Drawing Sheets

(51) Int. Cl.
*H04L 12/931* (2013.01)
*H04L 12/24* (2006.01)
*H04L 12/713* (2013.01)

(56) References Cited

U.S. PATENT DOCUMENTS

| | | | |
|---|---|---|---|
| 2009/0041023 | A1* | 2/2009 | Ould Brahim .......... H04L 12/66 370/395.3 |
| 2010/0158017 | A1* | 6/2010 | Casey ................. H04L 12/4658 370/395.53 |
| 2012/0008491 | A1* | 1/2012 | Shimada ............. H04L 12/4633 370/218 |
| 2012/0307826 | A1* | 12/2012 | Matsuoka ............... H04L 49/70 370/390 |
| 2013/0125124 | A1 | 5/2013 | Kempf et al. |
| 2013/0301472 | A1* | 11/2013 | Allan ...................... H04L 45/66 370/254 |
| 2013/0329728 | A1* | 12/2013 | Ramesh ................ H04L 12/462 370/390 |
| 2013/0346583 | A1* | 12/2013 | Low .................... H04L 12/4641 709/223 |
| 2014/0043972 | A1* | 2/2014 | Li ........................... H04L 45/50 370/230 |
| 2014/0112137 | A1* | 4/2014 | Schlansker ......... H04L 12/4641 370/235 |
| 2014/0314095 | A1* | 10/2014 | Saltsidis ................. H04L 47/41 370/394 |
| 2015/0143369 | A1* | 5/2015 | Zheng ................. H04L 12/4645 718/1 |
| 2015/0195104 | A1* | 7/2015 | Okuno .................... H04L 69/08 370/392 |
| 2015/0229552 | A1* | 8/2015 | Saltsidis ............. H04L 43/0811 370/241.1 |
| 2015/0304127 | A1* | 10/2015 | Xiao ...................... H04L 12/465 370/254 |
| 2016/0142226 | A1* | 5/2016 | Huang ................ H04L 12/4633 370/392 |

OTHER PUBLICATIONS

Mudigonda, Jayaram, et al. "NetLord: a scalable multi-tenant network architecture for virtualized datacenters." ACM SIGCOMM Computer Communication Review. vol. 41. No. 4. ACM, 2011.*
Bari, Md Faizul, et al. "Data center network virtualization: A survey." IEEE Communications Surveys & Tutorials 15.2 (2013): 909-928.*
Tu, Cheng-Chun. "Cloud-Scale Data Center Network Architecture."Monografia (2011).*
Jeuk, Sebastian, Shi Zhou, and Miguel Rio. "Tenant-id: Tagging tenant assets in cloud environments." Cluster, Cloud and Grid Computing (CCGrid), 2013 13th IEEE/ACM International Symposium on. IEEE, 2013.*
Azodolmolky, Siamak, Philipp Wieder, and Ramin Yahyapour. "SDN-based cloud computing networking." 2013 15th International Conference on Transparent Optical Networks (ICTON). IEEE, 2013.*

* cited by examiner

| virtual machine identifier | virtual machine MAC address | tenant identifier | server identifier |
|---|---|---|---|
| 1 | 01:23:45:67:89:ab | 2 | 1 |
| 2 | 01:23:45:67:89:ac | 3 | 2 |

NETWORK SYSTEM, SERVER, SWITCH, AND OPERATING METHOD OF NETWORK SYSTEM

RELATED APPLICATIONS

This application claims priority to Taiwan Application Serial Number 102119807, filed Jun. 4, 2013, which is herein incorporated by reference.

BACKGROUND

Technical Field

The present disclosure relates to an electronic system. More particularly, the present invention relates to a network system.

Description of Related Art

With advances in network technology, various kinds of network systems, such as server systems or data centers, are widely used in our daily lives.

A typical network system (e.g., a data center) includes a plurality of servers, a plurality of switches, and at least one spine switch. The servers can contain a plurality of virtual machines. Through a network infrastructure, the virtual machines in different servers can communicate with each other via the switches and the spine switch. However, in a traditional network infrastructure, when there are a large number of servers, an extremely large table must be maintained in the spine switch to record all the MAC addresses of the virtual machines, such that the packets can be forwarded according to the MAC addresses of the virtual machines. As a result, a considerable hardware resource is utilized to maintain the table, and the performance of the spine switch will be degraded as a result of processing an enormous amount of data, such that the performance of the network system in transmitting packets will be negatively affected.

Thus, there is an urgent need in the field to reduce the scale of the table maintained in the network.

SUMMARY

One aspect of the present invention is directed to a network system. In accordance with one embodiment of the present invention, the network system includes a first server and a first switch. The first server includes a first virtual machine. The first virtual machine generates a first virtual machine packet including a first virtual machine identifier and provides the first virtual machine packet to the first server. The first server acquires a tenant identifier corresponding to the first virtual machine according to the first virtual machine identifier, converts the tenant identifier to a first feature data, and encapsulates the first virtual machine packet to generate and output a first server packet containing the first feature data. The first switch receives the first server packet, fetches the first feature data, acquires a service instance identifier (I-SID) according to the first feature data, acquires a backbone VLAN identifier (B-VID) according to the 1-SID, and encapsulates the first server packet to generate and output a switch packet comprising the I-SID and the B-VID.

Another aspect of the present invention is directed to a server. The server includes a virtual machine and a processing module. The virtual machine generates a first virtual machine packet including a first virtual machine identifier and provides the first virtual machine packet to the processing module. The processing module acquires a tenant identifier corresponding to the virtual machine according to the virtual machine identifier, converts the tenant identifier to a first feature data, and encapsulates the first virtual machine packet to generate and output a first server packet containing the first feature data.

Another aspect of the present invention is directed to a switch. In accordance with one embodiment of the present invention, the switch receives a first server packet containing a first feature data, fetches the first feature data, acquires an I-SID according to the first feature data, acquires a B-VID according to the I-SID, and encapsulates the first server packet to generate and output a first switch packet including the I-SID and the B-VID.

Another aspect of the present invention is directed to an operating method of a network system. In accordance with one embodiment of the present invention, the network system includes a first server and a first switch. The first server includes a first virtual machine. The operating method includes generating a first virtual machine packet including a first virtual machine identifier, and providing the first virtual machine packet to the first server via the first virtual machine; acquiring a tenant identifier corresponding to the first virtual machine according to the first virtual machine identifier and converting the tenant identifier to a first feature data via the first server; encapsulating the first virtual machine packet to generate a first server packet containing the first feature data and output the first server packet to the first switch via the first server; receiving the first server packet, fetching the first feature data, acquiring an I-SID according to the first feature data, and acquiring a B-VID according to the I-SID via the first switch; and encapsulating the first server packet to generate and output a switch packet including the I-SID and the B-VID via the first switch.

Thus, through application of one of the embodiments mentioned above, a network system can be implemented. By embedding information corresponding to the tenant identifier into the first server packet and the switch packet, the switch packet can be forwarded according to the tenant identifier. With such a configuration, an enormous table configured to record the MAC addresses of all virtual machines can be omitted, such that the consumption of hardware resources can be minimized. In addition, during such an operation, the data processing load on a spine switch can be balanced to the servers, such that the data processing load of the spine switch can be decreased, and as a result, the performance of the network system in transmitting packets can be promoted.

BRIEF DESCRIPTION OF THE DRAWINGS

The invention can be more fully understood by reading the following detailed description of the embodiment, with reference made to the accompanying drawings as follows.

DETAILED DESCRIPTION

Figures 1, 2:
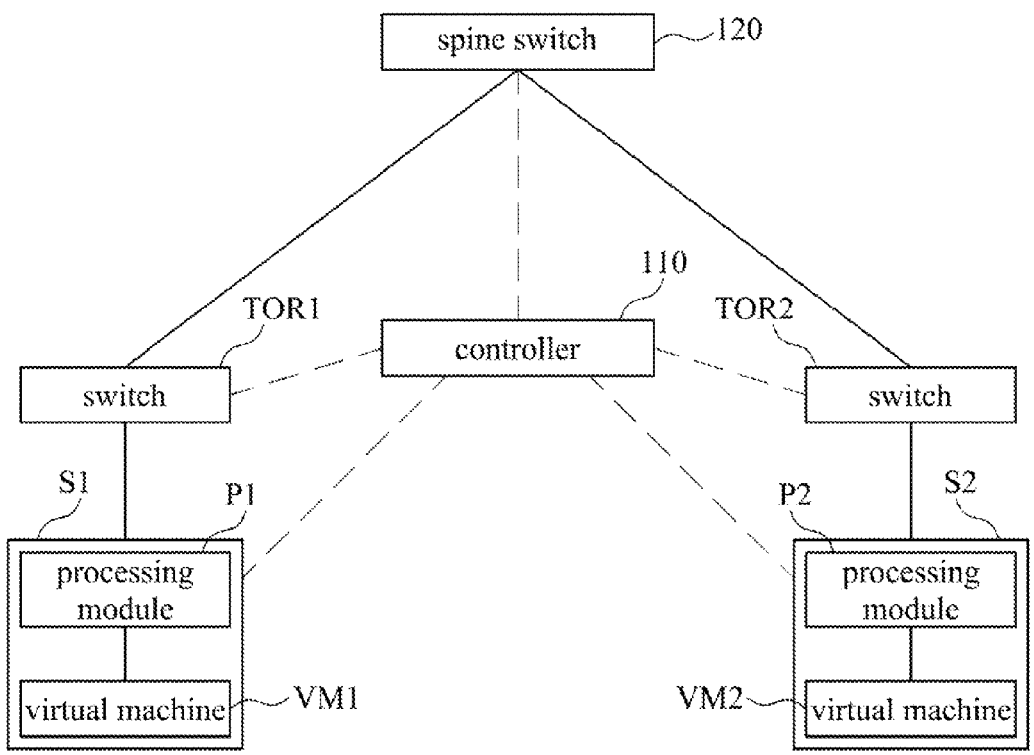
FIG. 1 is a schematic diagram of a network system in accordance with one embodiment of the present disclosure.
FIG. 2 is a schematic diagram of a tenant identifier to feature data mapping table in accordance with one embodiment of the present disclosure.

In the following detailed description, for purposes of explanation, numerous specific details are set forth in order to attain a thorough understanding of the disclosed embodiments. It will be apparent, however, that one or more embodiments may be practiced without these specific details. In other instances, well-known structures and devices are schematically shown in order to simplify the drawing.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims herein is not intended to invoke the provisions of 35 U.S.C. §112, 6th paragraph.

One aspect of the present disclosure is a network system. To facilitate the description to follow, a data center is taken as a descriptive example in the following paragraphs. However, the present disclosure is not limited to the embodiment below.

FIG. 1 is a schematic diagram of a network system 100 in accordance with one embodiment of the present disclosure. In this embodiment, the network system 100 includes a controller 110, a spine switch 120, switches TOR1, TOR2, and servers S1, S2. The spine switch 120 is electrically connected to the switches TOR1, TOR2. The switches TOR1, TOR2 can be top of rack (ToR) switches, but are not limited to this particular type of switch. The switches TOR1, TOR2 are electrically connected to the servers S1, S2 respectively. The controller 110 is electrically connected to the spine switch 120, the switches TOR1, TOR2, and the servers S1, S2. It should be noted that the quantities of the spine switch, the switches, and the servers in the network system 100 are not limited to the quantities in the embodiment above. In addition, the connections among the devices and the apparatuses in the network system 100 are not limited by the embodiment above, and any connection configuration enabling the controller 110 to practice the technical features described below can be used herein.

In the following paragraphs, the present disclosure will be described with a descriptive example in which the network system 100 has only two switches TOR1, TOR2 and two servers S1, S2. In addition, to facilitate the description to follow, in the following paragraphs, the servers S1, S2 are referred to as a first server S1 and a second server S2, and the switches TOR1, TOR2 are referred to as a first switch TOR1 and a second switch TOR2. In this embodiment, the first server S1 includes a processing module P1 and a first virtual machine VM1, but is not limited in this regard. The second server S2 includes a processing module P2 and a second virtual machine VM2, but is not limited in this regard. The processing modules P1, P2, the first virtual machine VM1, and the second virtual machine VM2 can be implemented by central processors or microprocessors.

In a first embodiment of the present disclosure, the controller 110 is configured to maintain a virtual machine identifier to tenant identifier mapping table, a tenant identifier to feature data mapping table, and a feature data to tenant identifier mapping table. In one embodiment, the virtual machine identifier to tenant identifier mapping table, as shown in FIG. 2, includes virtual machine identifiers, virtual machine MAC addresses, tenant identifiers, and server identifiers. Each the first server S1 and the second server S2 maintains entries corresponding to itself in the virtual machine identifier to tenant identifier mapping table. For example, the first server S1 maintains a row of a first entry in the virtual machine identifier to tenant identifier mapping table with the server identifier being 1, and the second server S2 maintains a row of a second entry in the virtual machine identifier to tenant identifier mapping table with the server identifier being 2. It should be noted that the virtual machine identifier to tenant identifier mapping table shown in FIG. 2 is merely an example, and the present disclosure is not limited to the embodiment disclosed herein.

In this embodiment, the first virtual machine VM1 is configured to generate a first virtual machine packet including a first virtual machine identifier, and provide the first virtual machine packet to the processing module P1 of the first server S1. In one embodiment, the first virtual machine packet is, for example, an untagged regular Ethernet packet.

The processing module P1 of the first server S1 is configured to receive the first virtual machine packet, and acquire a tenant identifier corresponding to the first virtual machine VM1 according to the first virtual machine identifier through the virtual machine identifier to tenant identifier mapping table.

Subsequently, the processing module P1 of the first server S1 is configured to convert the tenant identifier to a first feature data according to the tenant identifier according to the tenant identifier to feature data mapping table. Next, the processing module P1 of the first server S1 is configured to encapsulate the first virtual machine packet to generate a first server packet including the first feature data and output the first server packet to the first switch TOR1. In one embodiment, the processing module P1 of the first server S1 embeds the first feature data into a service virtual local area network (VLAN) identifier (S-VID) field of the first server packet. In addition, the first server packet is, for example, an Ethernet packet with a service VLAN tag (S-TAG).

The first switch TOR1 is configured to receive the first server packet, fetch the first feature data from the S-VID field of the first server packet, and acquire a service instance identifier (I-SID) according to the first feature data. Subsequently, the first switch TOR1 is configured to acquire a backbone VLAN identifier (B-VID) according to the I-SID, and remove the first feature data from the S-VID field of the first server packet. Next, the first switch TOR1 is configured to encapsulate the first server packet without the first feature data to generate and output a switch packet including the I-SID and the B-VID. In one embodiment, the switch packet is, for example, an Ethernet packet with an S-TAG and a backbone VLAN tag (B-TAG).

The spine switch 120 is configured to receive the switch packet and forward the switch packet to the second switch TOR2 according to the Institute of Electrical and Electronics Engineers (IEEE) 802.11ah standard.

The second switch TOR2 is configured to receive the switch packet, de-capsulate the switch packet, and generate a second server packet according to the switch packet. The second switch TOR2 is configured to acquire a 25 second feature data according to the I-SID of the switch packet. Subsequently, the second switch is configured to embed the second feature data into an S-VID field of the second server packet, and output the second server packet containing the second feature data to the second server S2. In one embodiment, the second server packet is, for example, an Ethernet packet with an S-TAG.

The processing module P2 of the second server S2 is configured to receive the second server packet, and de-capsulate the second server packet to generate a second virtual machine packet. The processing module P2 of the second server S2 is further configured to convert the second feature data to the tenant identifier according to the second feature data through the feature data to tenant identifier mapping table. Subsequently, the processing module P2 of the second server S2 is configured to provide the second virtual machine packet to the second virtual machine VM2 according to the tenant identifier and a second virtual machine identifier (e.g., a customer MAC destination address (C-MAC DA)) in the second server packet. In one embodiment, the second virtual machine packet is, for example, an untagged regular Ethernet packet.

It should be noted that, in this embodiment, the values of the first feature data and the second feature data can be different from each other. In addition, in this embodiment, since there are 12 bits in the S-VID field, one server can support about 4094 different tenant identifiers.

Through such operation, by embedding information corresponding to the tenant identifier into the S-VID field of the first server packet and the I-SID and the B-VID of the switch packet, the switch packet can be forwarded according to the tenant identifier. In such a manner, when the spine switch 120 forwards the switch packet according to the IEEE 802.1ah standard, an enormous table configured to record the MAC addresses of all virtual machines VM1, VM2 can be omitted, such that the consumption of hardware resources can be minimized.

In a second embodiment of the present disclosure, the controller 110 is configured to maintain a virtual machine identifier to tenant identifier mapping table and a feature data to I-SID mapping table.

In this embodiment, the first virtual machine VM1 is configured to generate a first virtual machine packet including a first virtual machine identifier, and provide the first virtual machine packet to the processing module P1 of the first server S1. In one embodiment, the first virtual machine packet is, for example, an untagged regular Ethernet packet.

The processing module P1 of the first server S1 is configured to receive the first virtual machine packet, and acquire a tenant identifier corresponding to the first virtual machine VM1 according to the first virtual machine identifier through the virtual machine identifier to tenant identifier mapping table.

Subsequently, the processing module P1 of the first server S1 is configured to calculate a first value and a second value of the first feature data according to the tenant identifier, and embed the first value and the second value of the first feature data respectively into the C-VID field of the first server packet and an S-VID field of the first server packet.

For example, when a value of the tenant identifier is T_ID, the first value of the first feature data is C, and the second value of the first feature data is S, T_ID, C, and S satisfy the following equations:

$C=(T\_ID-256)/4094+1$; and $S=((T\_ID-256)\text{MOD }4094)+1.$

Next, the processing module P1 of the first server S1 is configured to encapsulate the first virtual machine packet to generate a first server packet including the first feature data and output the first server packet to the first switch TOR1. In one embodiment, the first server packet is, for example, an Ethernet packet with an S-TAG and a C-TAG.

The first switch TOR1 is configured to receive the first server packet through a source port, fetch the first feature data from the S-VID field and the C-VID field of the first server packet, and acquire an I-SID according to the S-VID and the C-VID of the first server packet and a port number of said source port through the feature data to I-SID mapping table. Subsequently, the first switch TOR1 is configured to acquire a B-VID according to the I-SID, encapsulate the first server packet to generate and output a switch packet including the I-SID and the B-VID. In one embodiment, the switch packet is, for example, an Ethernet packet with an S-TAG and a B-TAG.

The TOR1 is configured forward the switch packet to the spine switch 120 according to the IEEE 802.11 ah standard.

The spine switch 120 is configured to receive the switch packet and forward the switch packet to the second switch TOR2 according to the Institute of Electrical and Electronics Engineers (IEEE) 802.11ah standard.

The second switch TOR2 is configured to receive the switch packet, de-capsulate the switch packet, and provide a second server packet according to the switch packet. The C-VID field and the S-VID field of the second server packet respectively contain the first value and the second value of the second feature data. In one embodiment, the second server packet is, for example, an Ethernet packet with a C-TAG and an S-TAG.

The processing module P2 of the second server S2 is configured to receive the second server packet, and de-capsulate the second server packet to generate a second virtual machine packet. The processing module P2 of the second server S2 is further configured to calculate the tenant identifier according to the first value and the second value of the second feature data. The first value and the second value of the second feature data are respectively contained in the C-VID and the S-VID of the second server packet.

For example, when a value of the tenant identifier is T_ID, the first value of the second feature data is C, and the second value of the second feature data is S, T_ID, C, and S satisfy the following equation:

$T\_ID=(C-1)\times 4096+(S-1)+256.$

Subsequently, the processing module P2 of the second server S2 is configured to provide the second virtual machine packet to the second virtual machine VM2 according to the tenant identifier and a second virtual machine identifier (e.g., C-MAC DA) in the second server packet. In one embodiment, the second virtual machine packet is, for example, an untagged regular Ethernet packet.

It should be noted that, in this embodiment, the first value of the first feature data and the first value of the second feature data can be identical, and the second value of the first feature data and the second value of the second feature data can be identical. In addition, since there are 12 bits in the S-VID field and 12 bits in the C-VID field, one server can support about 16 million different tenant identifiers.

Through such operation, by embedding information corresponding to the tenant identifier into the S-VID field and the C-VID field of the first server packet and the I-SID and the B-VID of the switch packet, the switch packet can be forwarded according to the tenant identifier. In such a manner, when the spine switch 120 forwards the switch packet according to the IEEE 802.1ah standard, an enormous table configured to record the MAC addresses of all virtual machines VM1, VM2 can be omitted, such that the consumption of hardware resources can be minimized.

Another aspect of the present disclosure is an operating method of a network system. The operating method can be applied to a network system having a structure that is the same as or similar to the structure shown in FIG. 1. To simplify the description below, in the following paragraphs, the embodiments shown in FIG. 1 will be used as an example to describe the operating method according to an embodiment of the present disclosure. However, the invention is not limited to application to the embodiment shown in FIG. 1.

In addition, it should be noted that in the steps of the following operating method, no particular sequence is required unless otherwise specified. Moreover, the following steps also may be performed simultaneously or their execution times may partially overlap.

Figure 3:
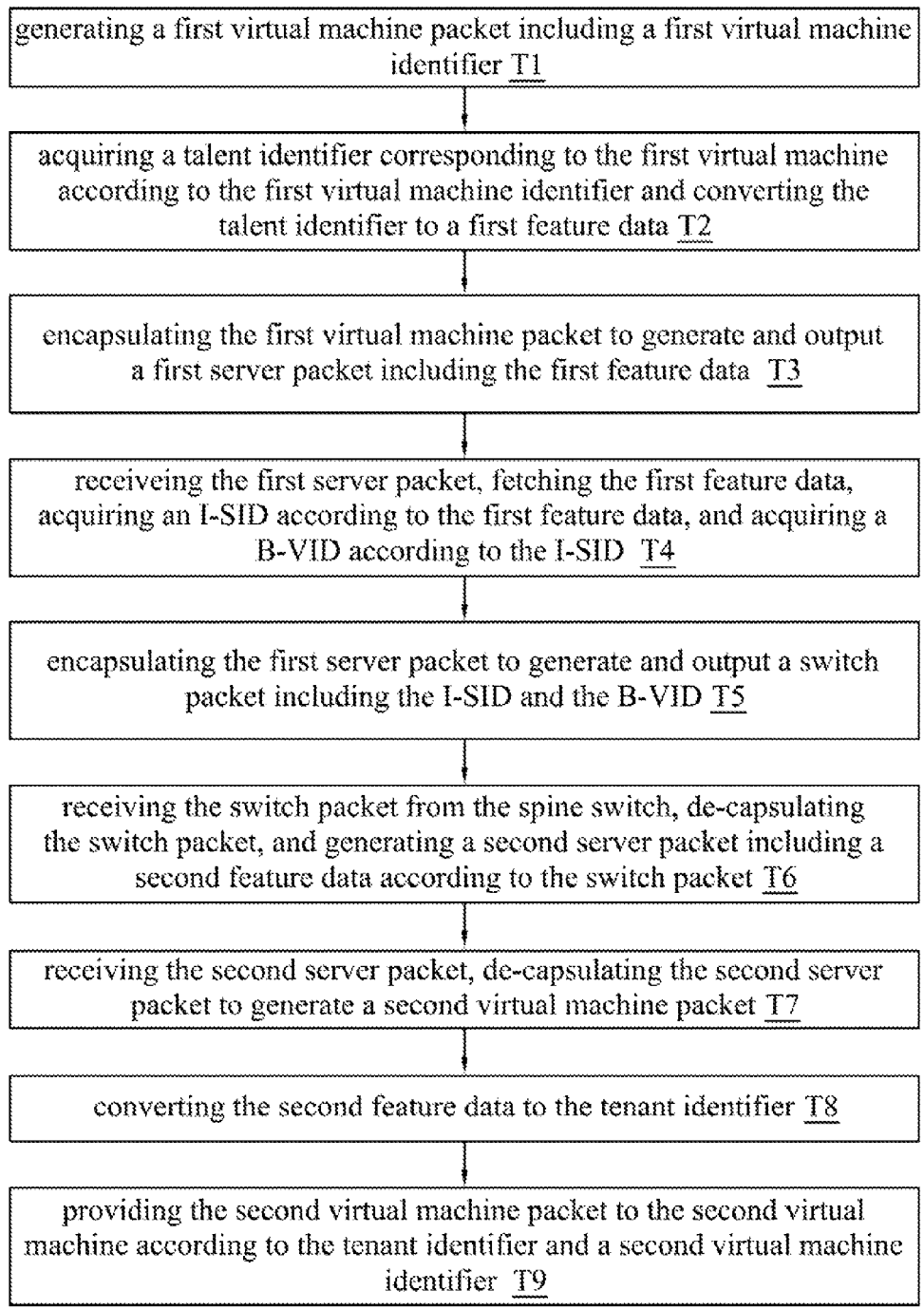
FIG. 3 is a flowchart of an operating method of the network system in accordance with one embodiment of the present disclosure.

FIG. 3 is a flowchart of an operating method 300 of the network system 100 in accordance with one embodiment of the present disclosure. In this embodiment, the operating method 300 includes the steps below, but is not limited in this regard.

In step T1, the first virtual machine VM1 generates a first virtual machine packet including a first virtual machine identifier and provides the first virtual machine packet to the processing module P1.

In step T2, the processing module P1 of the first server S1 receives the first virtual machine packet, acquires a tenant identifier corresponding to the first virtual machine VM1 according to the first virtual machine identifier through the virtual machine identifier to tenant identifier mapping table, and converts the tenant identifier to the first feature data.

In step T3, the processing module P1 of the first server S1 encapsulates the first virtual machine packet to generate a first server packet including the first feature data and output the first server packet to the first switch TOR1.

In step T4, the first switch TOR1 receives the first server packet, fetch the first feature data, acquire an I-SID according to the first feature data, and acquire a B-VID according to the I-SID.

In step T5, the first switch TOR1 encapsulates the first server packet to generate a switch packet including the I-SID and the B-VID and output the switch packet to the spine switch 120.

In step T6, the second switch TOR2 receives the switch packet from the spine switch 120, de-capsulates the switch packet, and generates a second server packet including a second feature data according to the switch packet.

In step T7, the processing module P2 of the second server receives the second server packet, and de-capsulates the second server packet to generate a second virtual machine packet.

In step T8, the processing module P2 of the second server S2 converts the second feature data to the tenant identifier.

In step T9, the processing module P2 of the second server S2 provides the second virtual machine packet to the second virtual machine VM2 according to the tenant identifier and a second virtual machine identifier.

It should be noted that details of steps T1-T9 can be ascertained by referring to the above paragraphs, and a description in this regard will not be repeated herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A network system comprising:
   a first server device comprising a first virtual machine, wherein the first virtual machine generates a first virtual machine packet comprising a first virtual machine identifier and provides the first virtual machine packet to the first server device, and the first server device acquires a tenant identifier corresponding to the first virtual machine according to the first virtual machine identifier, converts the tenant identifier to a first feature data; and encapsulates the first virtual machine packet to generate and output a first server packet containing the first feature data; and
   a first switch device which receives the first server packet, fetches the first feature data, acquires a service instance identifier (I-SID) according to the first feature data, acquires a backbone VLAN identifier (B-VID) according to the I-SID, and encapsulates the first server packet to generate and output a switch packet containing the I-SID and the B-VID.

2. The network system as claimed in claim 1, wherein the first server device acquires the tenant identifier corresponding to the first virtual machine according to a virtual machine identifier to tenant identifier mapping table.

3. The network system as claimed in claim 1, wherein the first server device converts the tenant identifier to the first feature data according to a tenant identifier to feature data mapping table, and embeds the first feature data into a service VLAN identifier (S-VID) field of the first server packet.

4. The network system as claimed in claim 1, wherein the first server device calculates a first value and a second value of the first feature data according to the tenant identifier, and embeds the first value and the second value of the first feature data respectively into a customer VLAN identifier (C-VID) field of the first server packet and an S-VID field of the first server packet.

5. The network system as claimed in claim 4, wherein a value of the tenant identifier is T_ID, the first value of the first feature data is C, and the second value of the first feature data is S, T_ID, C, and S satisfy the following equations:

$$C=(T\_ID-256)/4094+1; \text{ and}$$

$$S=((T\_ID-256) \text{MOD } 4094)+1.$$

6. The network system as claimed in claim 1 further comprising:
   a second switch device receiving the switch packet, de-capsulating the switch packet, and generating a second server packet containing a second feature data according to the switch packet; and
   a second server device comprising a second virtual machine, wherein the second server device receives the second server packet, de-capsulates the second server packet to generate a second virtual machine packet, converts the second feature data to the tenant identifier, and provides the second virtual machine packet to the second virtual machine according to the tenant identifier and a second virtual machine identifier in the second server packet.

7. The network system as claimed in claim 6, wherein the second server device converts the second feature data to the tenant identifier according to a feature data to tenant identifier mapping table, and the second feature data is contained in an S-VID field of the second server packet.

8. The network system as claimed in claim 6, wherein the second server device calculates the tenant identifier according to a first value and a second value of the second feature data, and the first value and the second value of the second feature data are respectively contained in a C-VID field and an S-VID field of the second server packet.

9. The network system as claimed in claim 8, wherein the value of the tenant identifier is T_ID, the first value of the second feature data is C, and the second value of the second feature data is S, T_ID, C, and S satisfy the following equation:

$$T\_ID=(C-1)\times 4096+(S-1)+256.$$

10. The network system as claimed in claim 1 further comprising:
a spine switch device configured to receive the switch packet and forward the switch packet according to the Institute of Electrical and Electronics Engineers (IEEE) 802.11ah standard.

11. A switch device comprising:
a memory; and
a processing module configured to:
receive a first server packet containing a first feature data,
fetch the first feature data from an S-VID field of the first server packet from an S-VID field of the first server packet,
acquire an I-SID according to the first feature data,
acquire a B-VID according to the I-SID, and
encapsulate the first server packet to generate and output a first server packet comprising the I-SID and the B-VID,
wherein the switch device receives the first server packet from a server device, wherein the first feature data is converted from a tenant identifier by the server device according to a tenant identifier to feature data mapping table, the server device acquires the tenant identifier corresponding to a virtual machine of the server device according to a first virtual machine identifier, and the first server packet is generated by encapsulating a virtual machine packet of the virtual machine of the server device;
wherein the switch device further receives a second switch packet comprising the I-SID, and acquires a second feature data according to the I-SID in the second switch packet, and embeds the second feature data corresponding to the I-SID into an S-VID field of the second server packet de-capsulated from the second switch packet.

12. A switch device comprising:
a memory; and
a processing module configured to:
receive a first server packet containing a first feature data,
fetch the first feature data,
acquire an I-SID according to the first feature data,
acquire a B-VID according to the I-SID, and
encapsulate the first server packet to generate and output a first switch packet comprising the I-SID and the B-VID,
wherein the switch device further receives a second switch packet comprising the I-SID and de-capsulates the second switch packet to generate a second server packet containing a second feature data, and wherein a C-VID field and an S-VID field of the second server packet respectively contain a first value of the second feature data and a second value of the second feature data.

13. An operating method of a network system, wherein the network system comprises a first server and a first switch, and the first server comprises a first virtual machine, the operating method comprising following steps:

generating a first virtual machine packet comprising a first virtual machine identifier and providing the first virtual machine packet to the first server via the first virtual machine;
acquiring a tenant identifier corresponding to the first virtual machine according to the first virtual machine identifier and converting the tenant identifier to a first feature data via the first server;
encapsulating the first virtual machine packet to generate a first server packet containing the first feature data and output the first server packet to the first switch via the first server;
receiving the first server packet, fetching the first feature data, acquiring an I-SID according to the first feature data and acquiring a B-VID according to the I-SID via the first switch; and
encapsulating the first server packet to generate and output a switch packet comprising the I-SID and the B-VID via the first switch.

14. The operating method as claimed in claim 13, wherein the step of acquiring the tenant identifier corresponding to the first virtual machine according to the first virtual machine identifier comprises:
acquiring the tenant identifier corresponding to the first virtual machine according to a virtual machine identifier to tenant identifier mapping table.

15. The operating method as claimed in claim 13, wherein the step of converting the tenant identifier to the first feature data comprises:
converting the tenant identifier to the first feature data according to a tenant identifier to feature data mapping table.

16. The operating method as claimed in claim 13, wherein the step of converting the tenant identifier to the first feature data comprises:
calculating a first value and a second value of the first feature data according to the tenant identifier; and
embedding the first value and the second value of the first feature data into a C-VID field and an S-VID field of the first server packet respectively.

17. The operating method as claimed in claim 16, wherein a value of the tenant identifier is T_ID, the first value of the first feature data is C, and the second value of the first feature data is S, T_ID, C, and S satisfy the following equations:

$$C=(T\_ID-256)/4094+1; \text{ and}$$

$$S=((T\_ID-256)\text{MOD } 4094)+1.$$

18. The operating method as claimed in claim 13, wherein the network system further comprises a second switch and a second server, the second server comprises a second virtual machine, and the operating method further comprises:
receiving the switch packet, de-capsulating the switch packet, and generating second server packet containing a second feature data according to the switch packet via the second switch;
receiving the second server packet and de-capsulating the second server packet to generate a second virtual machine packet via the second server;
converting the second feature data to the tenant identifier via the second server; and
providing the second virtual machine packet to the second virtual machine according to the tenant identifier and a second virtual machine identifier in the second server packet via the second server.

19. The operating method as claimed in claim 18, wherein the step of converting the second feature data to the tenant identifier comprises:
   converting the second feature data to the tenant identifier according to a feature data to tenant identifier mapping table, wherein the second feature data is contained in an S-VID field of the second server packet.

20. The operating method as claimed in claim 18, wherein the step of converting the second feature data to the tenant identifier comprises:
   calculating the tenant identifier according to a first value and a second value of the second feature data, wherein the first value and the second value of the second feature data are respectively contained in a C-VID field and an S-VID field of the second server packet.

21. The operating method as claimed in claim 20, wherein the value of the tenant identifier is T_ID, the first value of the second feature data is C, and the second value of the second feature data is S, T_ID, C, and S satisfy the following equation:

$$T\_ID=(C-1)\times 4096+(S-1)+256.$$

22. The operating method as claimed in claim 13, wherein the network system further comprises a spine switch, and the operating method further comprises:
   receiving the switch packet and forwarding the switch packet according to the Institute of Electrical and Electronics Engineers (IEEE) 802.11ah standard via the spine switch.

23. A server device comprising a virtual machine and a processing module, wherein the virtual machine generates a first virtual machine packet comprising a first virtual machine identifier and provides the first virtual machine packet to the processing module, and the processing module acquires a tenant identifier corresponding to the virtual machine according to the virtual machine identifier, converts the tenant identifier to a first feature data, and encapsulates the first virtual machine packet to generate and output a first server packet containing the first feature data,
   wherein the processing module converts the tenant identifier to the first feature data according to a tenant identifier to feature data mapping table, and embeds the first feature data into an S-VID field of the first server packet.

24. The server device as claimed in claim 23, wherein the processing module receives a second server packet containing a second feature data, and cle-capsulates the second server packet to generate a second virtual machine packet, converts the second feature data in the second server packet to the tenant identifier, and provides the second virtual machine packet to the virtual machine according to the tenant identifier and a second virtual machine identifier in the second server packet.

25. The server device as claimed in claim 24, wherein the processing module converts the second feature data to the tenant identifier according to a feature data to tenant identifier mapping table, and the second feature data is contained in an S-VID field of the second server packet.

26. A server device comprising a virtual machine and a processing module, wherein the virtual machine generates a first virtual machine packet comprising a first virtual machine identifier and provides the first virtual machine packet to the processing module, and the processing module acquires a tenant identifier corresponding to the virtual machine according to the virtual machine identifier, converts the tenant identifier to a first feature data, and encapsulates the first virtual machine packet to generate and output a first server packet containing the first feature data,
   wherein the processing module calculates a first value and a second value of the first feature data according to the tenant identifier, and embeds the first value and the second value of the first feature data respectively into a C-VID field and an S-VID field of the first server packet.

27. The server device as claimed in claim 26, wherein a value of the tenant identifier is T_ID, the first value of the first feature data is C, and the second value of the first feature data is S, T_ID, C, and S satisfy the following equations:

$$C=(T\_ID-256)/4094+1;\text{ and}$$

$$S=((T\_ID-256)\text{MOD }4094)+1.$$

28. The server device as claimed in claim 26, wherein the processing module receives a second server packet containing a second feature data, and de-capsulates the second server packet to generate a second virtual machine packet, converts the second feature data in the second server packet to the tenant identifier, and provides the second virtual machine packet to the virtual machine according to the tenant identifier and a second virtual machine identifier in the second server packet.

29. The server device as claimed in claim 28, wherein the processing module calculates the tenant identifier according to a first value and a second value of the second feature data, and the first value and the second value of the second feature data are respectively contained in a C-VID field and an S-VID field of the second server packet.

30. The server device as claimed in claim 29, wherein the processing module calculates the tenant identifier according to a first value and a second value of the second feature data, and the first value and the second value of the second feature data are respectively contained in a C-VID field and an S-VID field of the second server packet.

* * * * *